April 30, 1968  YUTAKA TAKUMA  3,381,194

DIGITAL GENERATOR-FED MOTOR CONTROL SYSTEM

Filed Dec. 16, 1963  2 Sheets-Sheet 1

INVENTOR
Yutaka Takuma

BY Paul M. Craig, Jr.
ATTORNEY

United States Patent Office 3,381,194
Patented Apr. 30, 1968

3,381,194
DIGITAL GENERATOR-FED MOTOR
CONTROL SYSTEM
Yutaka Takuma, Hitachi-shi, Japan, assignor to Hitachi,
Ltd., Tokyo, Japan, a corporation of Japan
Filed Dec. 16, 1963, Ser. No. 331,008
Claims priority, application Japan, Dec. 17, 1962,
37/55,407
7 Claims. (Cl. 318—145)

This invention relates to a digital no-contact control circuit for motor-generator systems of the Ward-Leonard type employing both actual generator voltage and actual motor field current for control purposes.

Generally, in the speed control of DC motors, the motor speed is controlled in the speed range lower than a preset normal speed by controlling the supply voltage to the motor while maintaining the intensified motor field and in the speed range exceeding the preset normal speed by regulating the motor field current while maintaining the motor supply voltage at its maximum.

Controlling DC motors in the above manner is a necessity for preventing overcurrents and expediting acceleration and deceleration in cases where the motor is required to effect quick acceleration and deceleration as in the case where it is used to drive a crane or a rolling mill. Such control systems are thus regarded as being most satisfactory, for DC motors in general.

Such motor controls, however, have previously involved various problems particularly in reliability and rapid-response characteristics on account of the use of a rotary amplifier and ordinary relay means. These problems have often proved to be a fatal deficiency particularly with cranes, rolling mills and the like equipment in which the motor control is required to serve reliably and rapidly under very rigorous conditions.

The present invention has for its object to provide a motor control device operable upon the above rational operating principles and of the so-called digital no-contact type comprised of digital logical elements.

Other objects and advantages of the present invention will become apparent as the description proceeds with reference to the accompanying drawings, in which FIG. 1 is a schematic diagram of the inventive control device as applied to a Ward-Leonard motor control system;

Figure 1:
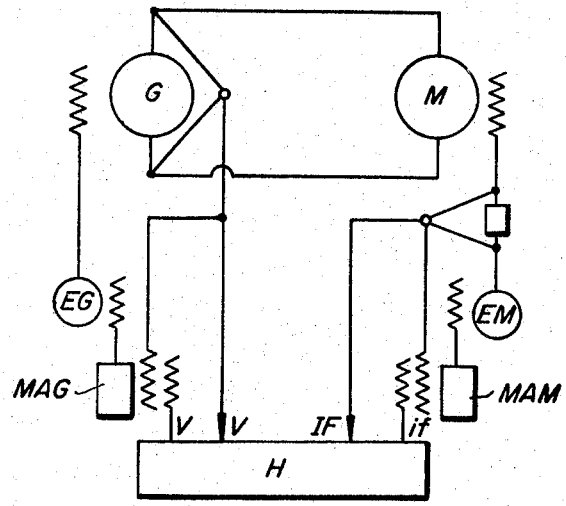

Referring to the drawings, and first to FIG. 1, reference character M indicates a motor; G a generator; EM a motor field exciter; EG a generator field exciter; MAM a magnetic amplifier for control of the motor; and MAG a magnetic amplifier for control of the generator. The reference character H generally indicates a digital no-contact control system according to the invention including no-contact switching devices, inhibit, "AND," hold-memory, "OR" and other digital circuit elements.

Figure 2:
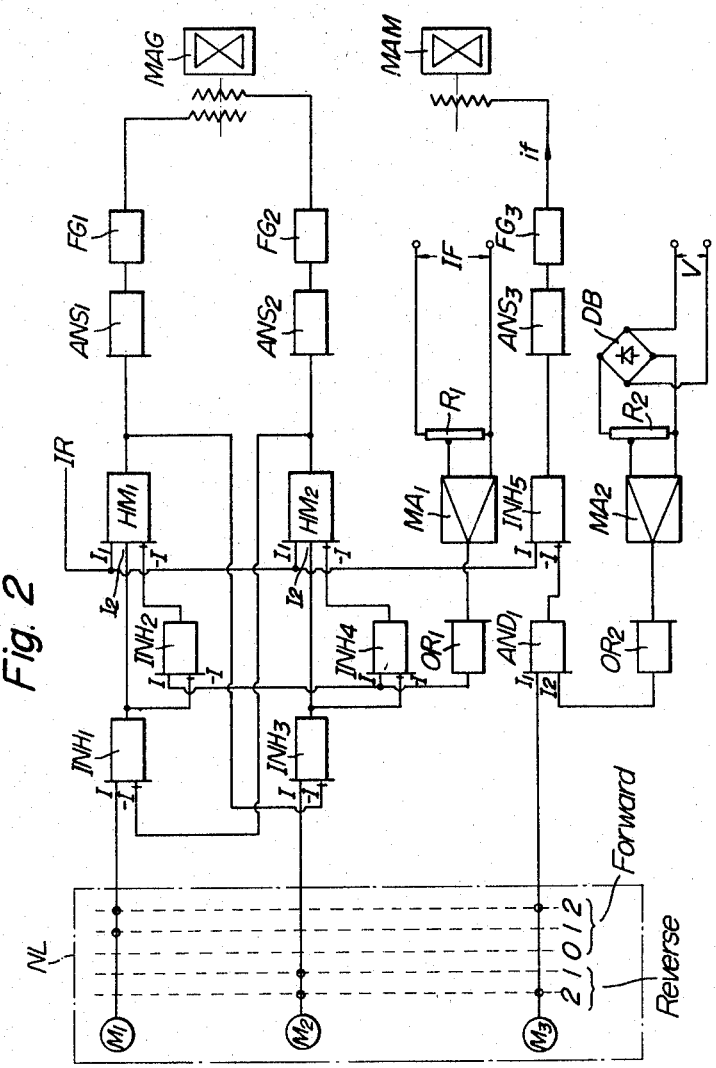
FIG. 2 is a block diagram of one embodiment of the invention.

The no-contact digital control device H will next be described in detail with reference to FIG. 2. A no-contact switch NL is provided which makes use, for example, of a differential voltage transformer and includes forward and reverse taps 1 and 2 which can be selected to obtain a predetermined direct current speed control directive signal from no-contact switches $M_1$, $M_2$ or $M_3$.

Figure 3:
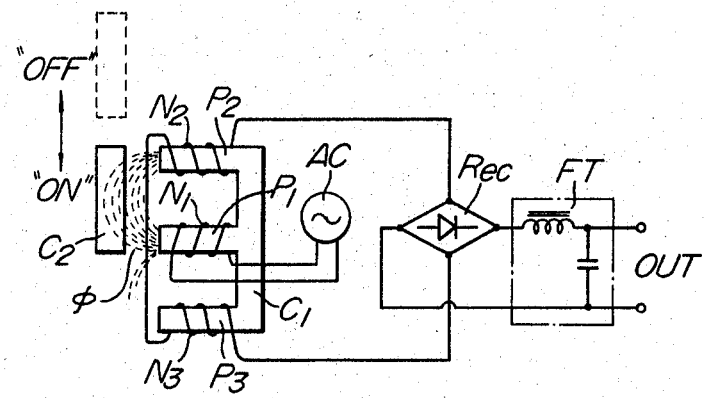
FIG. 3 is a showing of the E-shaped, non-contact switch used in this system.

As shown in FIGURE 3, each of the no-contact switches $M_1$, $M_2$ and $M_3$ consists of an E shaped iron core $C_1$, a primary coil $N_1$ wound on the central leg $P_1$ of the iron core $C_1$, secondary coils $N_2$ and $N_3$ wound on the end legs $P_2$ and $P_3$, respectively, and a movable iron core $C_2$ arranged in the neighborhood of the iron core $C_1$. These switches are made according to the well-known principle of a differential transformer, wherein voltages induced in the secondary coils $N_2$ and $N_3$ vary in accordance with the position of the movable iron core $C_2$. The primary coil $N_1$ is connected to an AC power source of suitable frequency, and the secondary coils $N_2$ and $N_3$ are connected in opposite polarities to each other.

When the movable iron core $C_2$ is at "OFF" position, where the iron core $C_2$ is positioned sufficiently apart from the iron core $C_1$, the magnetic flux $\theta$ generated in the central leg $P_1$ and the end legs $P_2$ and $P_3$ is balanced. Thus the induced voltages in the secondary coils $N_2$ and $N_3$ are equal, cancel each other, and no voltage appears across the rectifier Rec.

On the other hand, when the movable iron core $C_1$ is moved by an operator to the "ON" position where $C_1$ is in the neighborhood of the side leg $P_2$, the magnetic flux at the side of the leg $P_2$ increases greatly. This causes the induced voltage in the secondary coil $N_2$ to be increased. Accordingly, in the "ON" state, the voltages induced in the secondary coils $N_2$ and $N_3$, respectively, are not equal, and the value of the difference of both induced voltages is applied across the rectifier Rec. This voltage difference, rectified by the rectifier, supplies the no-contact, digital direct current speed directive output signal through the filter circuit F.

By connecting the movable iron core $C_2$ to a handle or a push button (not shown in the drawings), the movable iron core $C_2$ operates as a no-contact switch to generate the desired digital speed controlling directive signal without requiring that an operator contact a part of the control system that is electrically connected in any way to a high voltage part of the system. Thus electrical isolation is provided for purposes of personnel safety.

The no-contact digital directive controlling output signals from $M_1$ and $M_2$ are supplied to inhibit elements $INH_1$ and $INHI_3$, and the output signal from $M_3$ is supplied to AND gate $AND_1$.

Inhibit elements $INH_1$, $INH_2$, . . . $INH_5$ each have an input terminal I and an inhibit terminal $-I$ and have an output only when there exists an input to the input terminal and no input to the inhibit terminal. Hold-memory elements $HM_1$ and $HM_2$ each have input terminals $I_1$ and $I_2$ and an inhibit terminal $-I$ and have an output only when both the input terminals receive an input with no input to the inhibit terminal $-I$. The output of the hold-memory element once produced does not disappear as long as the input to either one of the two input terminals exists and disappears only when both inputs to the terminals $I_1$ and $I_2$ disappear or when the inhibit terminal is fed with an input. An "AND" element $AND_1$ gives an output only when its inputs to terminals $I_1$ and I are both present. Further "AND" elements $ANS_1$, $ANS_2$ and $ANS_3$ each produce an output when the input is present and the output voltage is completely reduced to zero when the input is absent. "OR" elements $OR_1$ and $OR_2$ each produce an output which appears and disappears with the input signal to the element. Reference characters $MA_1$ and $MA_2$ indicate respective magnetic amplifiers; $R_1$ and $R_2$ resistances; DB a diode bridge; and MAG and MAM generator and motor magnetic amplifiers shown in FIG. 1, also. Function generators $FG_1$, $FG_2$ and $FG_3$ are provided to provide a suitable control signal to the magnetic amplifier MAG and MAM in response to the output of the "AND" elements $ANS_1$, $ANS_2$ and $ANS_3$, respectively.

The operation of the present control device will now be described. At first, when the operating switch NL is operated to the first forward tap, the no-contact switch M₁ produces an output control signal which is applied to the input terminal I of the inhibit element INH₁. Since no input is present to the inhibit terminal —I of the inhibit element (with no signal from M₂ to INH₃), the element INH₁ produces an output which is sent to the inhibit element INH₂ as its inhibit input and also to the hold-memory element HM₁ as its input signal I₂. The hold-memory element HM₁ thus produces and maintains an output since interlock IR is at all times sending a signal to the hold-memory element HM₁ through its input terminal I₁ and there is no signal at this time from the inhibit element INH₂ to the inhibit terminal —I of the hold-memory HM₁. The output of the hold-memory element HM₁ actuates "AND" element ANS₁ to energize the generator controlling magnetic amplifier MAG through the function generator FG₁. As a result, the generator voltage is raised and accordingly the speed of motor M is increased, as will readily be understood. On this occasion, the inhibit element INH₅ is producing an output since the input terminal I of this inhibit element is receiving the signal from the interlock IR. Thus, the motor controlling magnetic amplifier MAM is energized by the output current if from the function generator FG₃. As a result, therefore, the motor M is in an intensified field condition and is started under this condition.

Subsequently, when the operating switch NL is advanced to the second tap, the no-contact switch M₃ starts to give a signal, the no-contact switch M₁ continuing to give a signal so that the above condition is maintained. The signal from no-contact switch M₃ enters "AND" element AND₁ at its input terminal I₁ but the "AND" element gives no output since no input is present at the other input terminal I₂ of the element. On the other hand, upon the generator voltage V having risen to its preset value, it is applied through diode bridge DB and resistance R₂ to the magnetic amplifier MA₂. Therefore, when the applied voltage reaches the operative value for MA₂, the "OR" element OR₂ starts to produce an output. (It is to be understood at this point that "OR" elements OR₁ and OR₂ give no output unless their preset value is reached.) Under these conditions the "AND" element AND₁ produces an output for the first time, which is applied to the inhibit element INH₅ at its inhibit terminal —I causing the output of the inhibit element INH₅ to disappear. Consequently, the input to the motor controlling magnetic amplifier MAM is diminished to weaken the motor field strength so that the motor speed is raised. As described above, the motor is first started under an intensified field condition and then is accelerated under voltage control until the generator voltage reaches its preset value. Thereafter, the motor is subjected to field control and further accelerated to attain its maximum speed.

For deceleration of the motor, the above procedure is effected this time in the entirely reversed sequence. At first, the operating switch is turned back to the first tap and the signal from no-contact switch M₃ is thus interrupted to eliminate the input to the inhibit element INH₅ at its inhibit terminal —I. As the result, the inhibit element INH₅ produces an output to energize the magnetic amplifier MAM so that the field of motor M is intensified to slowly reduce its speed. The operating switch is further turned back to its zero position so that the signal from no-contact switch M₁ is interrupted. As the field strength IF of the motor M reaches its maximum, the input to MA₁ reaches a value for operating MA₁ so that OR₁ produces its output and the input to inhibit element INH₂ remains only at its input terminal I but not at its inhibit terminal. As the result, the inhibit element INH₂ produces an output which reaches the inhibit terminal of the hold-memory element HM₁ to extinguish its output. The input to the generator controlling magnetic amplifier thus disappears and the field strength of the generator G is weakened to reduce its voltage. In this manner the motor comes to rest.

For reverse rotation, the operational sequence is similar to that described above for forward rotation except that the no-contact switch M₂ in place of switch M₁ produces a signal to operate inhibit elements INH₃ and INH₄, hold-memory element HM₂ and "AND" element ANS₂. When reversed, the generator voltage V is applied to the magnetic amplifier MA₂ after its polarity is made the same as that during forward rotation by means of diode bridge DB.

It is noted at this point that the interlock IR normally produces a signal in a continuous fashion but if any unusual condition such as an overcurrent and an overvoltage occurs the signal disappears to rapidly slow down the motor.

It will be appreciated from the foregoing that DC motors can be reliably controlled in a rational manner by the digital control device of the present invention, which operates completely in accordance with the actual values of the generator voltage and motor field current, and dispenses with contacts of any kind previously employed in the type of motor control to which the invention is concerned.

Having described one embodiment of a digital, no contact control circuit for motor-generator systems in accordance with the invention, other modifications, alterations and variations of the invention will be suggested to those skilled in the art. It is to be expressly understood, therefore, that any such modifications, etc. are considered to be within the scope of the present invention as defined by the appended claims.

What is claimed is:
1. A generator-motor control for a generator and motor system comprising a speed directive switching means for supplying speed controlling electric signals, memory means for storing the speed controlling directive signals and regulating the generator voltage to a preset value, motor field current sensing means for producing signals corresponding to the amount of field current of said motor, generator inhibiting means for inhibiting operation of said memory means only when the output signal of said motor field current sensing means is higher than a preset value, motor inhibiting means for normally making said motor field strength maximum in the absence of a motor inhibiting signal, generator voltage sensing means for producing a signal corresponding to the generator voltage, means for applying the output from said generator voltage sensing means to said motor inhibiting means as a motor inhibiting signal only when the output signal of said generator voltage sensing means is higher than a preset value, additional memory means for storing reverse control directive signals and regulating the generator voltage to a preset value in the reverse direction, and reverse generator inhibiting means coupled to the output of the motor field-current sensing means and to the additional memory means for inhibiting operation of said additional memory means only when the output signal of said motor field-current sensing means is higher than a preset value in the reverse direction.

2. A motor control according to claim 1 further comprising means for concurrently inhibiting operation of the generator and the motor to thereby slow down the motor upon the occurrence of an undesired operating condition.

3. A digital motor-generator control system comprising speed directive digital switching means for supplying digital speed controlling electric signals, first generator memory and inhibit means operatively coupled to said speed directive switching means and to the generator for regulating the generator voltage to a preset value in the absence of an inhibiting signal, motor inhibiting means operatively coupled to and controlling the motor field strength, said motor inhibiting means normally making the motor field maximum in the absence of an inhibiting signal, generator voltage sensing means operatively coupled to the generator for producing an output signal representative of the actual output voltage of the generation, generator voltage digital conversion means for converting the output from said generator voltage sensing means to a digital type inhibit signal upon the generator voltage reaching a preset value, AND circuit means having one input coupled to the speed directive digital switching means, a second input coupled to the output from the generator voltage conversion means and an output coupled to an input of the motor inhibiting means for supplying an inhibiting signal thereto, motor field current sensing means operatively coupled to the motor field for producing an output signal representative of the actual value of the motor field current, motor field current digital conversion means for converting the output from said motor field current sensing means to a digital type inhibit signal upon the motor field current reaching a preset value, and means for supplying the digital type motor field current inhibit signal to the first generator memory and inhibit means as an inhibiting signal.

4. A digital motor-generator control system according to claim 3 further comprising second generator memory and inhibit means operatively coupled to the speed directive switching means and to the generator for regulating the generator voltage to a preset value in the reverse direction in the absence of a reverse inhibiting signal, and means for supplying the digital type motor field current inhibiting signal to the second generator memory and inhibit means as an inhibiting signal to inhibit operation of the generator in the reverse direction.

5. A digital motor-generating control system according to claim 4 wherein the generator voltage sensing means includes a diode bridge for rendering the same operative in both the forward and reverse direction.

6. A digital motor-generator control system according to claim 5 further comprising means operatively coupled to the input of the first generator memory and inhibit means, the second generator and inhibit means and the motor inhibiting means for concurrently inhibiting further operation of said generator and motor upon the occurrence of an undesired operating condition.

7. A digital motor-generator control system according to claim 6 wherein the speed directive digital switching means comprises no-contact switching devices wherein the operator controlled actuating elements are electrically isolated from the remainder of the control system for the purpose of personnel safety.

References Cited
UNITED STATES PATENTS

| | | |
|---|---|---|
| 2,997,638 | 8/1961 | Brittain. |
| 3,192,482 | 6/1965 | Long _____ 318—154 X |
| 2,783,424 | 2/1957 | Fath et al. _____ 318—145 |
| 2,929,975 | 3/1960 | Caldwell et al. _____ 318—154 |
| 3,022,453 | 2/1962 | Jones _____ 318—154 |
| 3,041,514 | 6/1962 | Hansen _____ 318—154 |
| 3,093,779 | 6/1963 | Hansen et al. _____ 318—143 |
| 3,148,318 | 9/1964 | Bradburn et al. _____ 318—154 |
| 3,189,809 | 6/1965 | Sueker _____ 318—145 |
| 3,219,900 | 11/1965 | Wilkerson _____ 318—145 X |

ORIS L. RADER, *Primary Examiner.*

THOMAS LYNCH, *Examiner.*